United States Patent
O'Keeffe et al.

(10) Patent No.: US 9,331,947 B1
(45) Date of Patent: May 3, 2016

(54) PACKET-RATE POLICING AND ADMISSION CONTROL WITH OPTIONAL STRESS THROTTLING

(75) Inventors: Francis Joseph O'Keeffe, Cork (IE); Thomas Cloonan, Lisle, IL (US); Mark Lynch, Lisle, IL (US)

(73) Assignee: ARRIS Enterprises, Inc., Suwanee, GA (US)

(*) Notice: Subject to any disclaimer, the term of this patent is extended or adjusted under 35 U.S.C. 154(b) by 104 days.

(21) Appl. No.: 12/898,055

(22) Filed: Oct. 5, 2010

Related U.S. Application Data

(60) Provisional application No. 61/248,852, filed on Oct. 5, 2009.

(51) Int. Cl.
| | |
|---|---|
| *H04L 12/813* | (2013.01) |
| *H04L 12/931* | (2013.01) |
| *H04L 12/70* | (2013.01) |

(52) U.S. Cl.
CPC .............. *H04L 47/20* (2013.01); *H04L 49/503* (2013.01); *H04L 2012/5636* (2013.01)

(58) Field of Classification Search
USPC .............. 370/235, 231, 401, 389, 230.1, 230, 370/252, 254, 229, 232, 233, 236, 237; 379/23.01; 709/212
See application file for complete search history.

(56) References Cited

U.S. PATENT DOCUMENTS

| | | | | |
|---|---|---|---|---|
| 8,537,673 | B1* | 9/2013 | Venkatesan | H04L 45/24 370/230.1 |
| 8,543,685 | B1* | 9/2013 | Gormley | H04L 47/525 709/224 |
| 2002/0122386 | A1* | 9/2002 | Calvignac | H04L 12/5601 370/230 |
| 2002/0186661 | A1* | 12/2002 | Santiago | H04L 47/10 370/252 |
| 2005/0002405 | A1* | 1/2005 | Gao | G06F 13/102 370/401 |
| 2006/0072451 | A1* | 4/2006 | Ross | H04L 47/10 370/229 |

FOREIGN PATENT DOCUMENTS

| | | | | |
|---|---|---|---|---|
| SE | WO 0056023 | A1 * | 9/2000 | H04L 29/06 |

* cited by examiner

*Primary Examiner* — Andrew Lai
*Assistant Examiner* — Jamaal Henson
(74) *Attorney, Agent, or Firm* — Bart A. Perkins

(57) ABSTRACT

Systems and methods can provide for packet-rate policing and admission control with optional stress throttling. In some implementations, a broadband device can monitor bandwidth usage and respond after exceeding a maximum packet-rate threshold based on a per-channel basis. In other implementations, a broadband device can monitor bandwidth usage and respond after exceeding a maximum packet-rate threshold based on a per-service-flow basis. In additional implementations, a broadband device processor can feedback data to the packet-rate policer to throttle the packet rate based on processor utilization. Policing data traffic based on packet-rate instead of bandwidth can increase flexibility to service providers as an increasing number of services are deployed to users.

16 Claims, 8 Drawing Sheets

PACKET-RATE POLICING AND ADMISSION CONTROL WITH OPTIONAL STRESS THROTTLING

TECHNICAL FIELD

This disclosure relates to packet-rate policing in broadband communication devices.

BACKGROUND

Policing is a term of art with many definitions and implementations. In the network context, policing typically refers to network traffic management, which includes two distinct components: measurement and control. Measurement is the manner in which the policer monitors data packet flows and compares the measurements to pre-configured thresholds. Control can take several forms, including packet dropping or packet delay or packet marking. Traditionally, policing has been implemented on a bandwidth basis.

Among the varied network that can benefit from policing are high-speed data connection providers to end user. Such networks can implement policing according to the specific standards and associated terminating devices such as, for example, Data-Over-Cable Service Interface Specification (DOCSIS) cable modem termination systems (CMTS) for existing cable infrastructure, digital subscriber line access multiplexer (DSLAM) over existing telephony infrastructure, PON OLTs and other last-mile edge systems, among many others. Broadband devices at locations such as the headend (for Cable's DOCSIS service) or central office (for Telco's DSL or PON service) to the user endpoints are being called upon to support many new mixes of service types such as, for example, voice-over-Internet protocol (VoIP), HSD, and video over IP (or IPTV) services.

The DOCSIS specification was established by cable television network operators to facilitate transporting data packets, primarily internet packets, over existing community antenna television (CATV) networks. In addition to transporting data packets, as well as television content signals over a CATV network, multiple services operators (MSO) also use their CATV network infrastructure for carrying voice, video on demand (VoD) and video conferencing packet signals, among other types.

Traditionally, policing and admission control algorithms in last-mile broadband devices have focused on managing link bandwidth. However, as service providers have increased their service offerings, bandwidth policing has become a less effective as a method to monitor and control network traffic.

DETAILED DESCRIPTION

Figure 1:
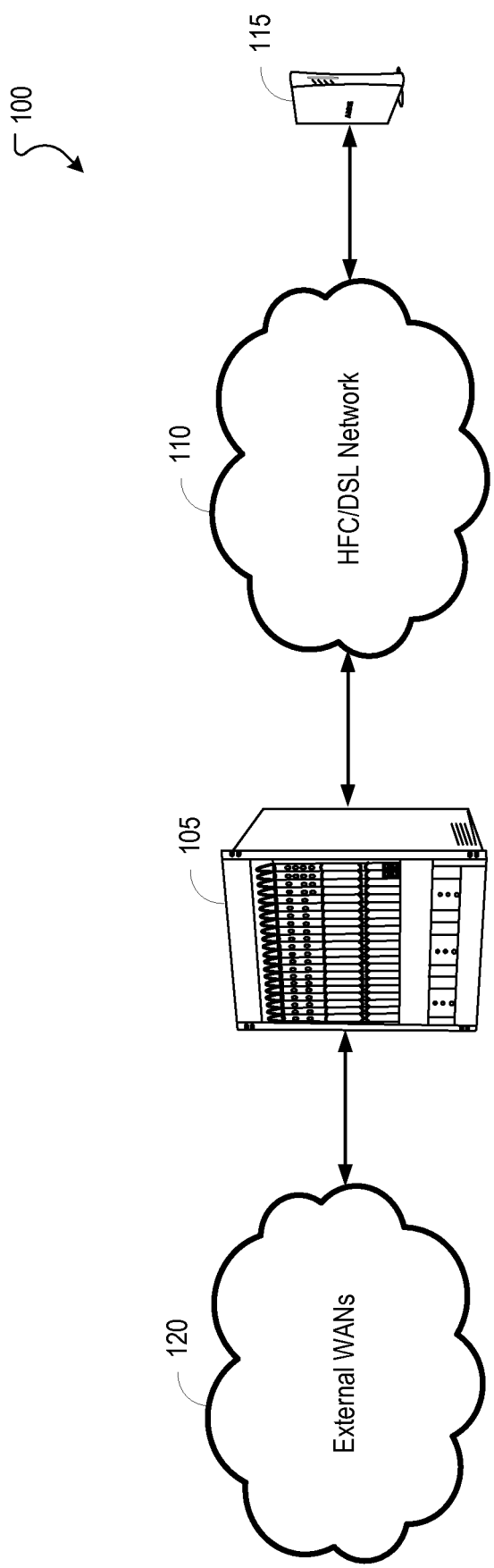
FIG. 1 is a block diagram illustrating an example network environment operable to provide packet-rate policing and admission control with optional stress throttling.

Packet-based policing can provide for increased flexibility thereby reducing network congestion. A service flow is a packet stream that has some header fields in common. In some implementations, a service flow can be, for example, a TCP packet stream whose packets all have the same Source IP Address, Source TCP Port, Destination IP Address, and Destination TCP Port. In other implementations, a service flow can be all packets with a common Destination IP Address. Monitoring of this packet processing usage can be used, because as the packet processing usage continues to grows, more lower-level processing resources are reserved.

In some implementations of this disclosure, systems and methods can operate to provide packet-rate policing and admission control with optional stress throttling. In some implementations, a broadband device can monitor incoming packet rates and respond after exceeding a maximum packet-rate threshold based on a per-channel or per-service-flow basis. In some implementations, if per-service-flow packet-rate policing is performed, then the packet classification function can be moved outside of the processor and included in the packet-rate policer or another module. The broadband device can receive packets from the external wide-area networks (WANs). In some implementations, the broadband device can police and control the incoming packet rate by calculating the maximum packet rate for a give time with the time interval, maximum sustained packet rate, and maximum traffic burst size. For example, the calculation can use the following arithmetic formula:

$$\text{Max}(T) = (T*R) + B$$

where Max(T) is the maximum number of packets passed in any time interval T, R is the maximum sustained packet rate, and B is the maximum number of packets allowed in a traffic burst. In this example, the parameters R and B can be preconfigured. It should be understood that variation on the equation above can be used to implement packet-rate policing and admission control.

When the maximum number of packets passed in any time interval is exceeded, the packet-rate policer can respond by performing various control mechanisms. In some implementations, the packet-rate policer can respond by dropping or delaying additional packets within a channel or service flow. In alternative implementations, the packet-rate policer can mark the packet for drop or delay in the future by the processor or other device module. In other implementations, the packet-rate policer can respond to exceeding a maximum threshold differently based on the packet-size of packets received. In still further implementations, the packet-rate policer can downgrade one or more service-flow priority levels. It should be understood that one, more than one, or additional responses can be taken by the packet-rate policer when the maximum threshold is exceeded.

Systems and methods can also operate to provide processor feedback data to the packet-rate policer to throttle the packet rate based on processor utilization. In some implementations, a stress feedback mechanism can be incorporated into the computation of maximum packet-rate to throttle the packet-rate policer based on the processor utilization. In some implementations, a feedback mechanism can be transmitted from the processor to the packet-rate policer via an internal signal or message. The feedback information can contain the processor utilization and/or a configurable stress factor used by the packet-policer to throttle packets based on high processor utilization levels. For example, the stress throttling calculation can use the following arithmetic formula:

$$\mathrm{Max}(T) = (T*R/S(p)) + B$$

where Max(T) is the maximum number of packets passed in any time interval T, R is the maximum sustained packet rate, B is the maximum number of packets allowed in a traffic burst, and S(p) is the stress factor as a function of the priority level. It should be understood that the stress factor function can be a static or dynamic variable and the optional stress throttling can be applied on a per-channel or per-service-flow packet-rate policer.

FIG. 1 is a block diagram illustrating an example network environment operable to provide packet-rate policing and admission control with optional stress throttling. In some implementations, a headend device such as, for example, a CMTS 105 can transmit video, data, voice service(s), and/or other signals to through a HFC/DSL network 110 to an end user 115. In other implementations, the headend device can be a DSLAM or other broadband terminating system. The CMTS 105 can receive video and data from external WANs 120 and transmit that data to one or more end users 115. Moreover, the CMTS 105 can receive video and data from end users 115 and transmit that data to other entities connected to the external WANs 120.

Packet-rate policing can occur when the data from external WANs 120 destined to the end user 115 exceeds a calculated or predetermined threshold at the headend CMTS 105. In such cases, the packet-rate policer at the CMTS 105 will respond according to preconfigured values in conjunction with network measurements. In some implementations, the packet-rate policer can operate on a per-channel basis. In other implementations, the packet-rate policer can operate on a per-service-flow basis. Additional, the packet-rate policer can also incorporate stress throttling based on the CMTS 105 processor.

Figure 2:
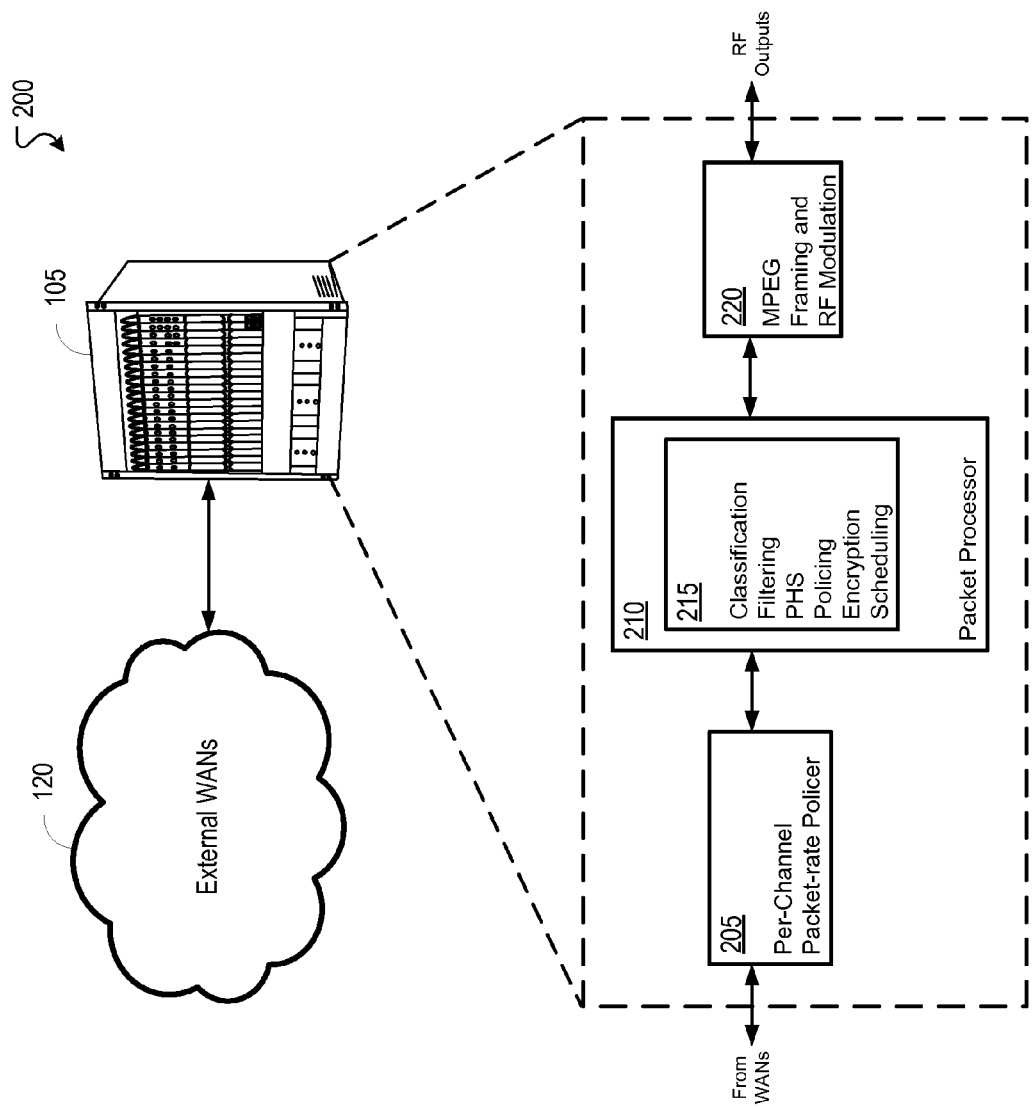
FIG. 2 is a block diagram illustrating an example headend operable to provide per-channel packet-rate policing and admission control.

FIG. 2 is a block diagram illustrating an example headend operable to provide per-channel packet-rate policing and admission control. In some implementations, a headend device such as, for example, a CMTS 105 (e.g., CMTS 105 of FIG. 1) can receive video, data, voice service(s), and/or other signals from external WANs 120 destined for one or more end users (e.g., end user 115 of FIG. 1). In other implementations, the headend device can be a DSLAM or other broadband terminating system.

Packet-rate policing can begin with data from external WANs 120 destined for the end user is received by the CMTS 105. In some implementations, the data is processed by a per-channel packet-rate policer module. The per-channel packet-rate policer module 205 is operable to monitor incoming packets and to respond based on a calculated or preconfigured threshold of maximum packets per given time interval.

Among the various actions a per-channel packet-rate policer module 205 can perform in response to excessive maximum packet rate is to drop the packet or delay the packet. In some implementations, the per-channel packet-rate policer module 205 can mark the packet for drop or delay at a later time. In other implementations, the per-channel packet-rate policer module 205 can filter based on packet size. It should be understood that one or more than one of these responses can be performed in response to a maximum exceeded packet threshold.

After examination by the per-channel packet-rate policer module 205 the packet proceeds for main processing at a CMTS packet processor 210. The packet processor can include functions such as, for example, classification, filtering, PHS, policing, encryption, and scheduling 215, among many others. The packet is then processed for MPEG framing, if needed, and radio-frequency (RF) modulated 220 for transmission to the end user.

Figure 3:
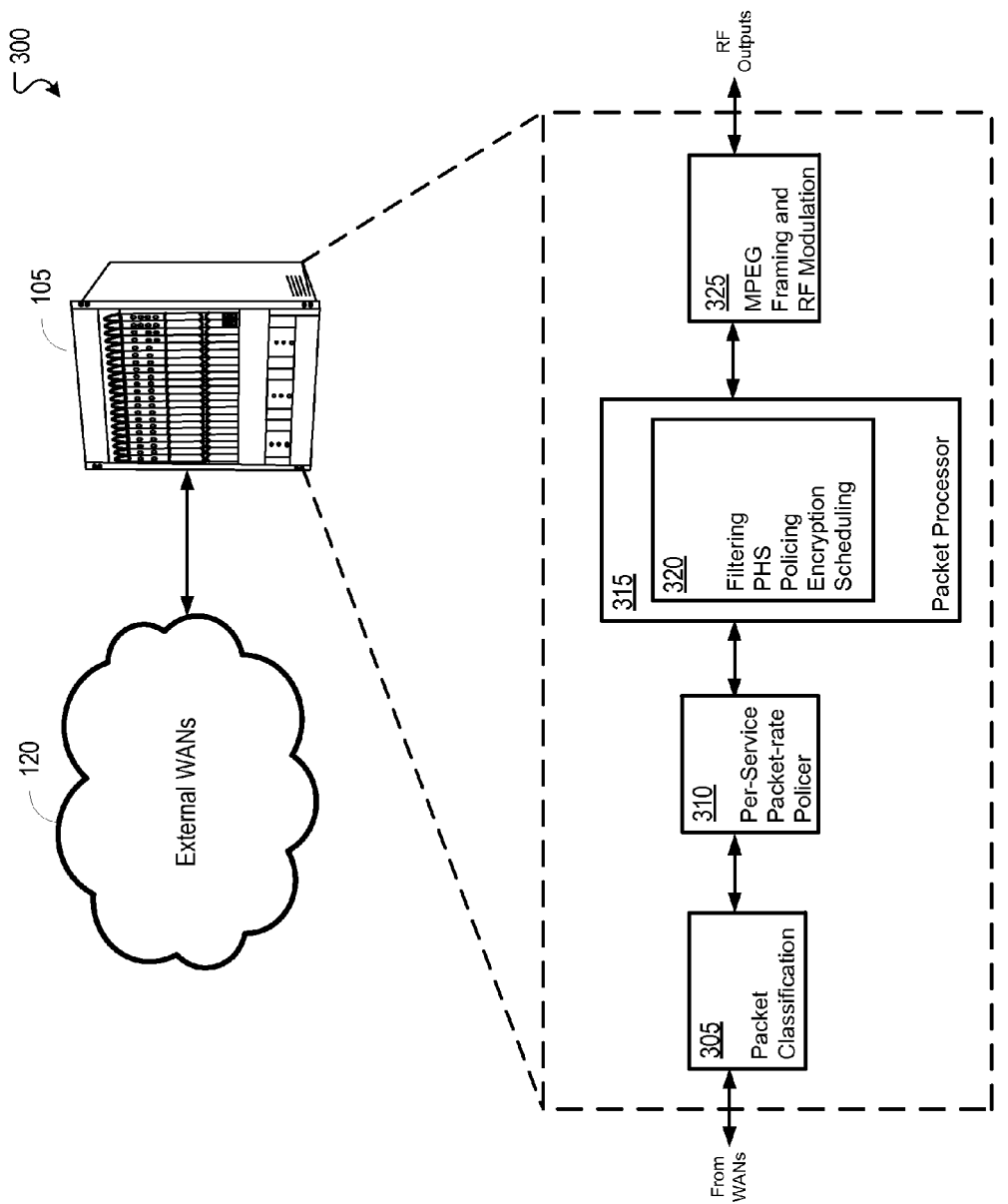
FIG. 3 is a block diagram illustrating an example headend operable to provide per-service-flow packet-rate policing and admission.

FIG. 3 is a block diagram illustrating an example headend operable to provide per-service-flow packet-rate policing and admission. In some implementations, a headend device such as, for example, a CMTS 105 (e.g., CMTS 105 of FIG. 1) can receive video, data, voice service(s), and/or other signals from external WANs 120 destined for one or more end users (e.g., end user 115 of FIG. 1). In other implementations, the headend device can be a DSLAM or other broadband terminating system.

Packet-rate policing can begin with data from external WANs 120 destined for the end user is received by the CMTS 105. In some implementations, the data is processed by a per-service-flow packet-rate policer module following classification by the packet classification 305 module. The per-service-flow packet-rate policer module 310 is operable to monitor incoming packets and to respond based on a calculated or preconfigured threshold of maximum packets per given time interval.

Among the various actions a per-service-flow packet-rate policer module 310 can perform in response to excessive maximum packet rate is to drop the packet or delay the packet. In some implementations, the per-service-flow packet-rate policer module 310 can mark the packet for drop or delay at a later time. In other implementations, the per-service-flow packet-rate policer module 310 can also filter based on packet size. In still further implementations, the per-service-flow packet-rate policer module 310 can downgrade a service-flow priority level. It should be understood that one or more than one of these responses can be performed in response to a maximum exceeded packet threshold.

After examination by the per-service-flow packet-rate policer module 310 the packet proceeds for main processing at a CMTS packet processor 315. The packet processor can include functions such as, for example, filtering, PHS, policing, encryption, and scheduling 320, among many others. The packet is then processed for MPEG framing, if needed, and radio-frequency (RF) modulated 325 for transmission to the end user.

Figure 4:
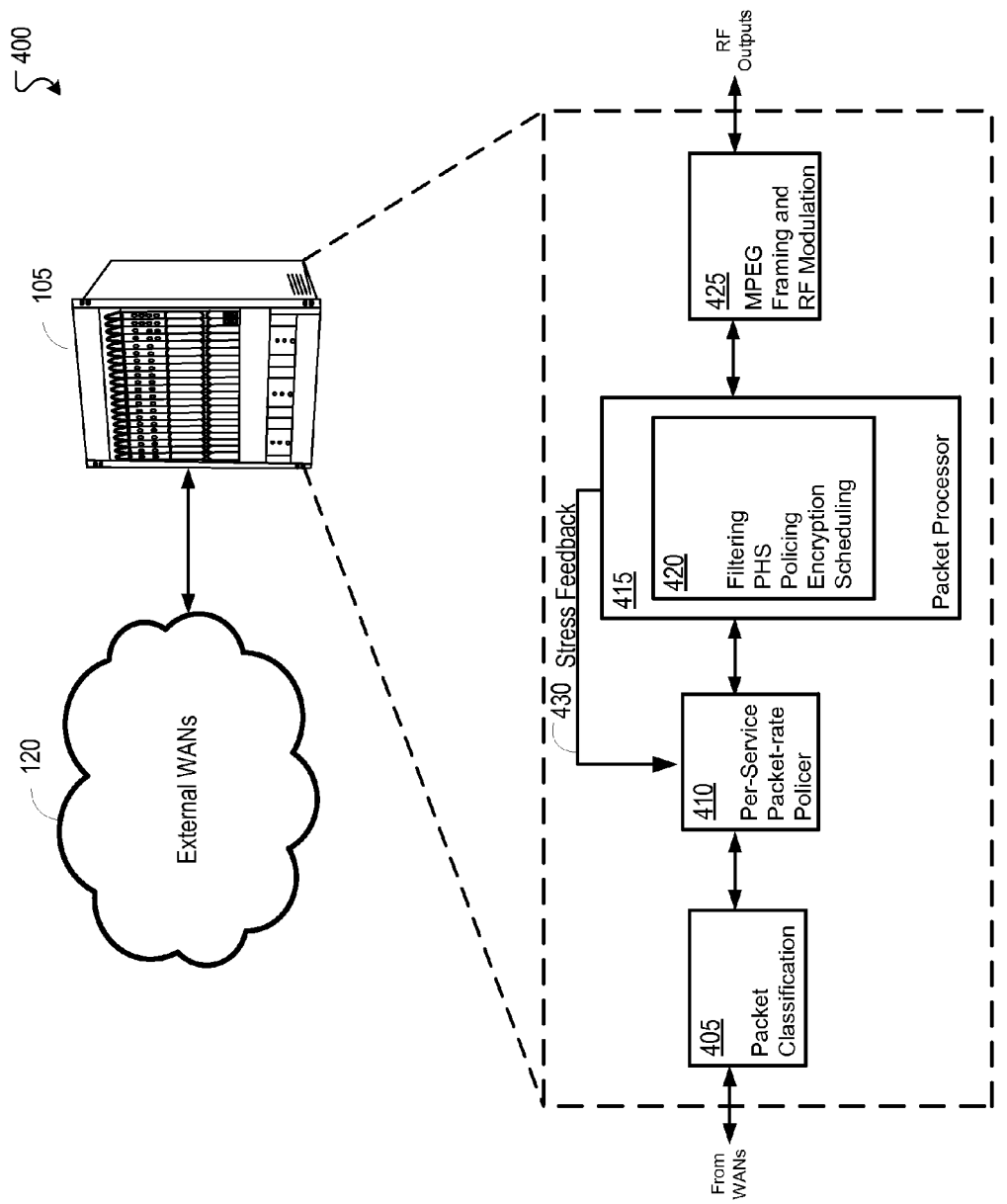
FIG. 4 is a block diagram illustrating an example headend operable to provide per-service-flow packet-rate policing and admission control with stress throttling.

FIG. 4 is a block diagram illustrating an example headend operable to provide per-service-flow packet-rate policing and admission control with stress throttling. In alternative implementations, the headend can perform per-channel packet-rate policing and admission control with stress throttling. In some implementations, a headend device such as, for example, a CMTS 105 (e.g., CMTS 105 of FIG. 1) can receive video, data, voice service(s), and/or other signals from external WANs 120 destined for one or more end users (e.g., end user 115 of FIG. 1). In other implementations, the headend device can be a DSLAM or other broadband terminating system.

Packet-rate policing can begin with data from external WANs 120 destined for the end user is received by the CMTS 105. In some implementations, the data is processed by a per-service-flow packet-rate policer module following classification by the packet classification 405 module. The per-service-flow packet-rate policer module 410 is operable to monitor incoming packets and to respond based on a calculated or preconfigured threshold of maximum packets per given time interval in conjunction with a stress throttling feedback 430 from the packet processor.

Among the various actions a per-service-flow packet-rate policer module 410 can perform in response to excessive maximum packet rate is to drop the packet or delay the packet. In some implementations, the per-service-flow packet-rate policer module 410 can mark the packet for drop or delay at a later time. In other implementations, the per-service-flow packet-rate policer module 410 can also filter based on packet size. In still further implementations, the per-service-flow packet-rate policer module 410 can downgrade a service-flow priority level. It should be understood that one or more than one of these responses can be performed in response to a maximum exceeded packet threshold.

The response can cease once the threshold value is no longer exceeded or the stress factor 430 is reduced. After examination by the per-service-flow packet-rate policer module 410 the packet proceeds for main processing at a CMTS packet processor 415. The packet processor can include functions such as, for example, filtering, PHS, policing, encryption, and scheduling 420, among many others. The packet is then processed for MPEG framing, if needed, and radio-frequency (RF) modulated 425 for transmission to the end user.

Figure 5:
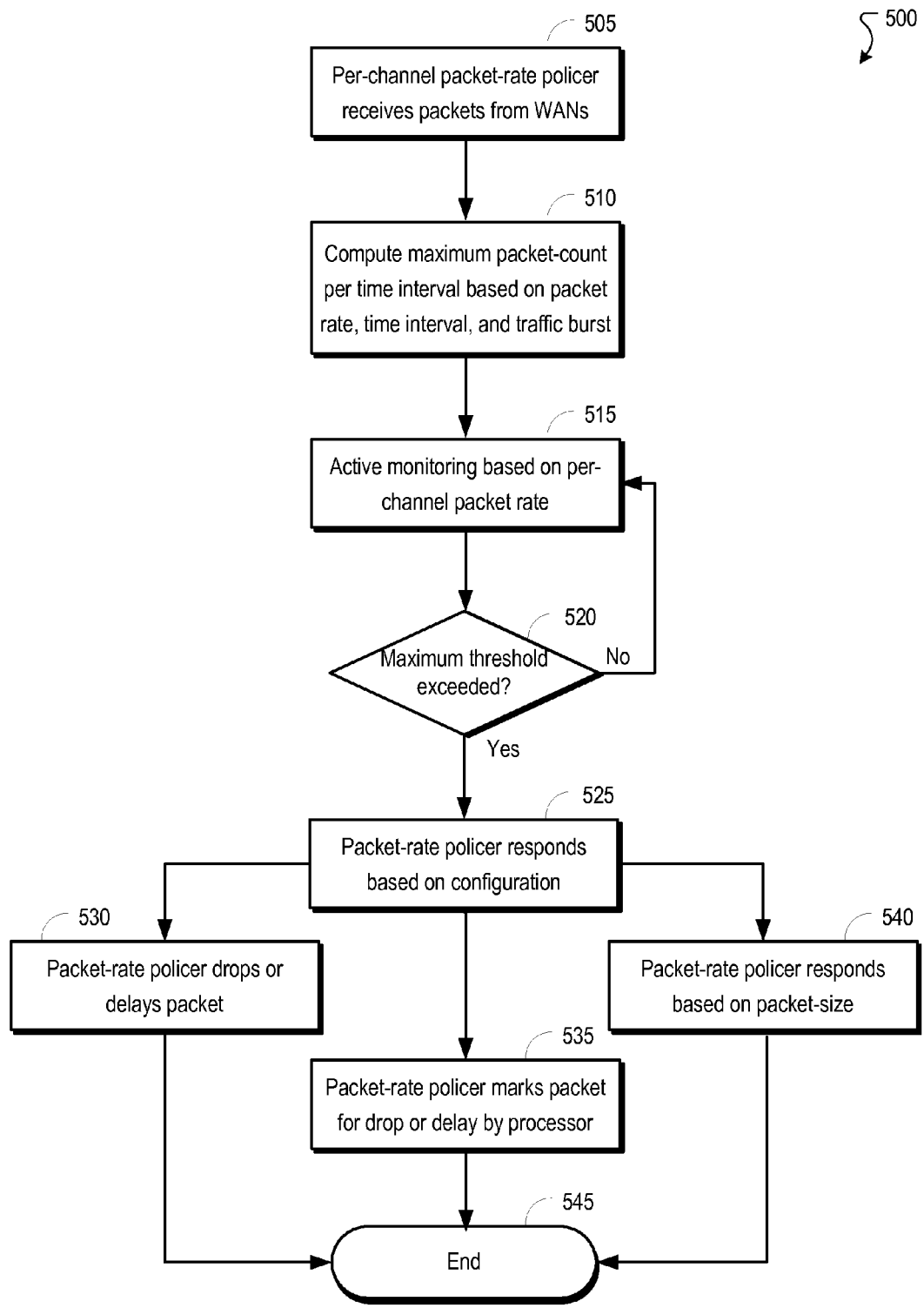
FIG. 5 is a flowchart illustrating an example process operable to provide per-channel packet-rate policing and admission control.

FIG. 5 is a flowchart illustrating an example process operable to provide per-channel packet-rate policing and admission control. The process 500 begins at stage 505 when the per-channel packet-rate policer receives data packets from WANs. The CMTS (e.g., CMTS 105 of FIG. 1 and FIG. 2) per-channel packet-rate policer (e.g., per-channel packet-rate policer 205 of FIG. 2) module can receive data from external WANs (e.g., external WANs 120 of FIG. 1 and FIG. 2) for transmission to end users (e.g., end users 115 of FIG. 1). In some implementations, the per-channel packet-rate policer can be in a part of the packet processor. In other implementations, the per-channel packet-rate policer can be integrated into another module.

At stage 510, the per-channel packet-rate policer module can compute the maximum packet-count per time interval based on packet rate, time interval, and traffic burst. The computation can occur in the packet-rate policer (e.g., per-channel packet-rate policer 205 of FIG. 2) module and/or the packet processor (e.g., packet processor 210 of FIG. 2). In some implementations, the variables can be configurable. In other implementations, additional variables can also be used to calculate the threshold value.

At stage 515, the per-channel packet-rate policer module actively monitors the per-channel packet rate. The monitoring can occur in the packet-rate policer (e.g., per-channel packet-rate policer 205 of FIG. 2) module. In some implementations, monitoring can occur in another module with the broadband device.

At stage 520, a determination is made whether the calculated maximum packet-rate threshold has been exceeded. The determination can be made by the packet-rate policer (e.g., per-channel packet-rate policer 205 of FIG. 2) module and/or the packet processor (e.g., packet processor 210 of FIG. 2). In some implementations, the threshold changes dynamically within a given time frame. In other implementations, the packet-rate used is a smoothed average to increase policing accuracy.

If the maximum threshold has not been exceeded, then process 500 returns to stage 515 and the broadband device resumes active monitoring. The monitoring can occur in the packet-rate policer (e.g., per-channel packet-rate policer 205 of FIG. 2) module. In some implementations, monitoring can occur in another module with the broadband device.

If the maximum threshold has been exceeded, then the per-channel packet-rate policer responds based on configuration and/or network conditions at stage 525. The response can occur with actions from the per-channel packet-rate policer (e.g., per-channel packet-rate policer 205 of FIG. 2) module and/or the packet processor (e.g., packet processor 210 of FIG. 2). The per-channel packet-rate policer can respond by performing one or more of the actions at stage 530, stage 535, and stage 540.

At stage 530, the per-channel packet-rate policer can drop or delay incoming packets. The drop or delay can be performed by the per-channel packet-rate policer (e.g., per-channel packet-rate policer 205 of FIG. 2) module. In some implementations, per-channel packet-rate policer can drop or delay all packets on a channel until the threshold is no longer exceeded. In other implementations, the per-channel packet rate policer can drop or delay packets based on other characteristics such as, for example, sequence number. The process can end at stage 545.

At stage 535, the per-channel packet-rate policer can mark the packet for drop or delay by the processor. The marking can be performed by the per-channel packet-rate policer (e.g., per-channel packet-rate policer 205 of FIG. 2) module and the drop or delay can be performed by the packet processor (e.g., packet processor 210 of FIG. 2). In some implementations, per-channel packet-rate policer can mark all packets on a channel until the threshold is no longer exceeded. In other implementations, the per-channel packet rate policer can mark packets based on other characteristics such as, for example, sequence number. The process can end at stage 545.

At stage 540, the per-channel packet-rate policer can drop or delay incoming packets based on packet size. The drop or delay can be performed by the per-channel packet-rate policer (e.g., per-channel packet-rate policer 205 of FIG. 2) module. In some implementations, per-channel packet-rate policer can drop or delay packets of a minimum or maximum size on a channel until the threshold is no longer exceeded. In other implementations, the per-channel packet rate policer can drop or delay packets in conjunction with other characteristics such as, for example, sequence number. The process can end at stage 545.

Figure 6:
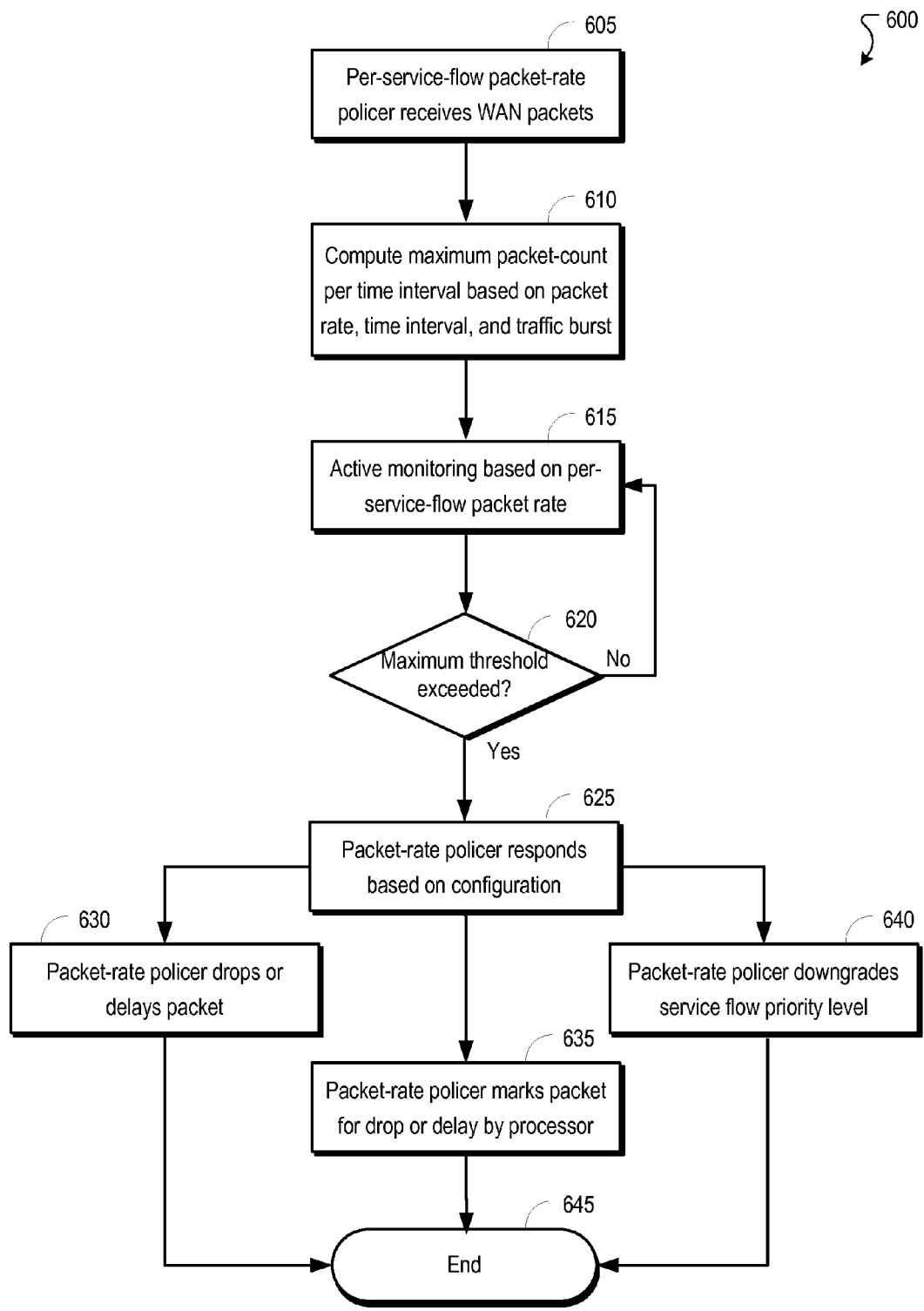
FIG. 6 is a flowchart illustrating an example process operable to provide per-service-flow packet-rate policing and admission.

FIG. 6 is a flowchart illustrating an example process operable to provide per-service-flow packet-rate policing and admission. The process 600 begins at stage 605 when the per-service-flow packet-rate policer receives data packets from WANs. The CMTS (e.g., CMTS 105 of FIG. 1 and FIG. 2) per-service-flow packet-rate policer (e.g., per-service-flow packet-rate policer 310 of FIG. 3) module can receive data from external WANs (e.g., external WANs 120 of FIG. 1 and FIG. 2) for transmission to end users (e.g., end users 115 of FIG. 1). In some implementations, the per-service-flow packet-rate policer can be in a part of the packet processor. In other implementations, the per-service-flow packet-rate policer can be integrated into another module.

At stage 610, the per-service-flow packet-rate policer module can compute the maximum packet-count per time interval based on packet rate, time interval, and traffic burst. The computation can occur in the per-service-flow packet-rate policer (e.g., per-service-flow packet-rate policer 310 of FIG. 3) module and/or the packet processor (e.g., packet processor 315 of FIG. 3). In some implementations, the variables can be configurable. In other implementations, additional variable can also be used to calculate the threshold value.

At stage 615, the per-service-flow packet-rate policer module actively monitors the per-service-flow packet rate. The monitoring can occur in the packet-rate policer (e.g., per-service-flow packet-rate policer 310 of FIG. 3) module. In some implementations, monitoring can occur in another module with the broadband device.

At stage 620, a determination is made whether the calculated maximum packet-rate threshold has been exceeded. The determination can be made by the packet-rate policer (e.g., per-service-flow packet-rate policer 310 of FIG. 3) module and/or the packet processor (e.g., packet processor 315 of FIG. 3). In some implementations, the threshold changes dynamically within a given time frame. In other implementations, the packet-rate used is a smoothed average to increase policing accuracy.

If the maximum threshold has not been exceeded, then process 600 returns to stage 615 and the broadband device resumes active monitoring. The monitoring can occur in the per-service-flow packet-rate policer (e.g., per-service-flow packet-rate policer 310 of FIG. 3) module. In some implementations, monitoring can occur in another module with the broadband device.

If the maximum threshold has been exceeded, then the per-service-flow packet-rate policer responds based on configuration and/or network conditions at stage 625. The response can occur with actions from the per-service-flow packet-rate policer (e.g., per-service-flow packet-rate policer 310 of FIG. 3) module and/or the packet processor (e.g., packet processor 315 of FIG. 3). The per-service-flow packet-rate policer can respond by performing one or more of the actions at stage 630, stage 635, and stage 640.

At stage 630, the per-service-flow packet-rate policer can drop or delay incoming packets. The drop or delay can be performed by the per-service-flow packet-rate policer (e.g., per-service-flow packet-rate policer 310 of FIG. 3) module. In some implementations, per-service-flow packet-rate policer can drop or delay all packets on a service flow until the threshold is no longer exceeded. In other implementations, the per-service-flow packet rate policer can drop or delay packets in conjunction with other characteristics such as, for example, sequence number or packet size. The process can end at stage 645.

At stage 635, the per-service-flow packet-rate policer can mark the packet for drop or delay by the processor. The marking can be performed by the per-service-flow packet-rate policer (e.g., per-service-flow packet-rate policer 310 of FIG. 3) module and the drop or delay can be performed by the packet processor (e.g., packet processor 315 of FIG. 3). In some implementations, per-service-flow packet-rate policer can mark all packets on a service flow until the threshold is no longer exceeded. In other implementations, the per-service-flow packet rate policer can mark packets based on other characteristics such as, for example, sequence number or packet size. The process can end at stage 645.

At stage 640, the per-service-flow packet-rate policer can drop or delay incoming packets based on packet size. The drop or delay can be performed by the per-service-flow packet-rate policer (e.g., per-service-flow packet-rate policer 310 of FIG. 3) module. In some implementations, per-service-flow packet-rate policer can drop or delay packets of a minimum or maximum size on a service flow until the threshold is no longer exceeded. In other implementations, the per-service-flow packet rate policer can drop or delay packets in conjunction with other characteristics such as, for example, sequence number or packet size. The process can end at stage 645.

Figure 7:
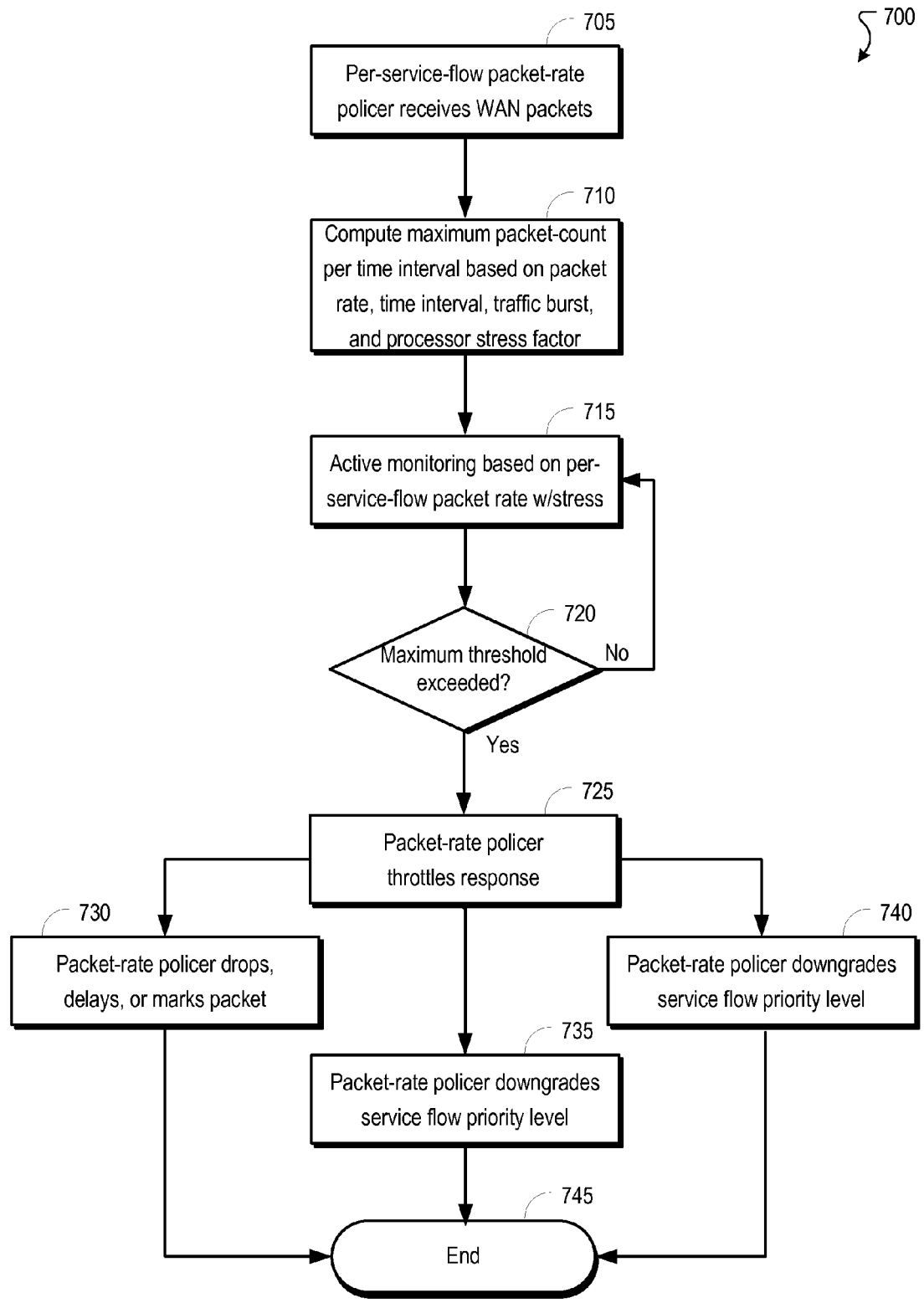
FIG. 7 is a flowchart illustrating an example process operable to provide per-service-flow packet-rate policing and admission with stress throttling.

FIG. 7 is a flowchart illustrating an example process operable to provide per-service-flow packet-rate policing and admission with stress throttling. The process 700 begins at stage 705 when the per-service-flow packet-rate policer receives data packets from WANs. The CMTS (e.g., CMTS 105 of FIG. 1 and FIG. 2) per-service-flow packet-rate policer (e.g., per-service-flow packet-rate policer 410 of FIG. 4) module can receive data from external WANs (e.g., external WANs 120 of FIG. 1 and FIG. 2) for transmission to end users (e.g., end users 115 of FIG. 1). In some implementations, the per-service-flow packet-rate policer can be in a part of the packet processor. In other implementations, the per-service-flow packet-rate policer can be integrated into another module.

At stage 710, the per-service-flow packet-rate policer module can compute the maximum packet-count per time interval based on packet rate, time interval, traffic burst, and stress factor. The computation can occur in the per-service-flow packet-rate policer (e.g., per-service-flow packet-rate policer 410 of FIG. 4) module and/or the packet processor (e.g., packet processor 415 of FIG. 4) and the stress factor (e.g., stress feedback 430 of FIG. 4) can be a feedback loop from the processor to the packet-rate policer. In some implementations, the variables can be configurable. In other implementations, additional variable can also be used to calculate the threshold value.

At stage 715, the per-service-flow packet-rate policer module actively monitors the per-service-flow packet rate. The monitoring can occur in the packet-rate policer (e.g., per-service-flow packet-rate policer 410 of FIG. 4) module. In some implementations, monitoring can occur in another module with the broadband device.

At stage 720, a determination is made whether the calculated maximum packet-rate threshold has been exceeded. The determination can be made by the packet-rate policer (e.g., per-service-flow packet-rate policer 410 of FIG. 4) module and/or the packet processor (e.g., packet processor 415 of FIG. 4). In some implementations, the threshold changes dynamically within a given time frame. In other implementations, the packet-rate used is a smoothed average to increase policing accuracy.

If the maximum threshold has not been exceeded, then process 700 returns to stage 715 and the broadband device resumes active monitoring. The monitoring can occur in the per-service-flow packet-rate policer (e.g., per-service-flow packet-rate policer 410 of FIG. 4) module. In some implementations, monitoring can occur in another module with the broadband device.

If the maximum threshold has been exceeded, then the per-service-flow packet-rate policer throttles based on configuration and/or network conditions at stage 725. The response can occur with actions from the per-service-flow packet-rate policer (e.g., per-service-flow packet-rate policer 410 of FIG. 4) module and/or the packet processor (e.g., packet processor 415 of FIG. 4) and/or the stress factor (e.g., stress factor 430 of FIG. 4) feedback. The per-service-flow packet-rate policer can respond by performing one or more of the actions at stage 730, stage 735, and stage 740.

At stage 730, the per-service-flow packet-rate policer can drop or delay incoming packets. The drop or delay can be performed by the per-service-flow packet-rate policer (e.g., per-service-flow packet-rate policer 410 of FIG. 4) module. In some implementations, per-service-flow packet-rate policer can drop or delay all packets on a service flow until the threshold is no longer exceeded. In other implementations, the per-service-flow packet rate policer can drop or delay packets in conjunction with other characteristics such as, for example, sequence number or packet size. The process can end at stage 745.

At stage 735, the per-service-flow packet-rate policer can mark the packet for drop or delay by the processor. The marking can be performed by the per-service-flow packet-rate policer (e.g., per-service-flow packet-rate policer 410 of FIG. 4) module and the drop or delay can be performed by the packet processor (e.g., packet processor 415 of FIG. 4). In some implementations, per-service-flow packet-rate policer can mark all packets on a service flow until the threshold is no longer exceeded. In other implementations, the per-service-flow packet rate policer can mark packets based on other characteristics such as, for example, sequence number or packet size. The process can end at stage 745.

At stage 740, the per-service-flow packet-rate policer can drop or delay incoming packets based on packet size. The drop or delay can be performed by the per-service-flow packet-rate policer (e.g., per-service-flow packet-rate policer 410 of FIG. 4) module. In some implementations, per-service-flow packet-rate policer can drop or delay packets of a minimum or maximum size on a service flow until the threshold is no longer exceeded. In other implementations, the per-service-flow packet rate policer can drop or delay packets in conjunction with other characteristics such as, for example, sequence number or packet size. The process can end at stage 745.

Figure 8:
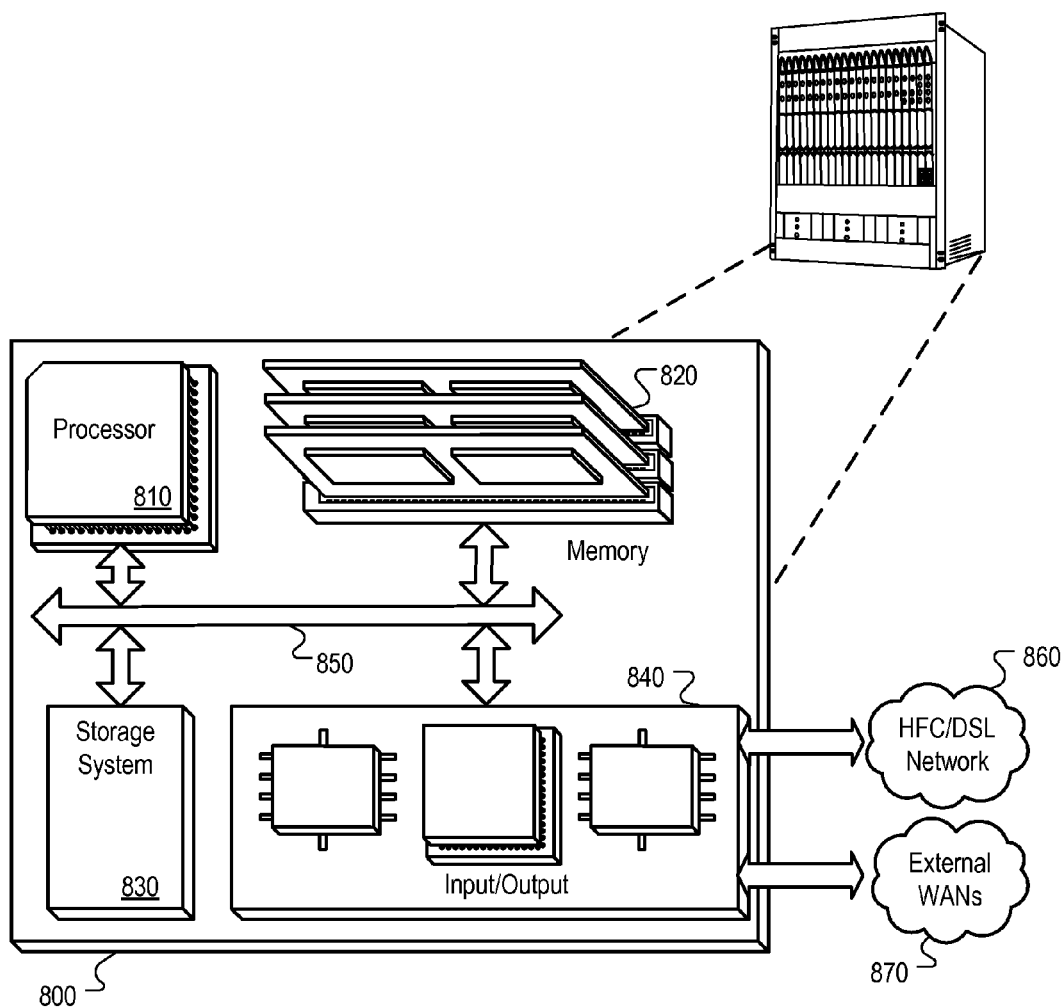
FIG. 8 is a block diagram of a broadband device operable to provide packet-rate policing and admission control with optional stress throttling.

FIG. 8 is a block diagram of a broadband device operable to provide packet-rate policing and admission control with optional stress throttling. The broadband device 800 can include a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the device 800. In one implementation, the memory 820 is a computer-readable medium. In one implementation, the memory 820 is a volatile memory unit. In another implementation, the memory 820 is a non-volatile memory unit.

In some implementations, the storage device 830 is capable of providing mass storage for the device 800. In one implementation, the storage device 830 is a computer-readable medium. In various different implementations, the storage device 830 can, for example, include a hard disk device, an optical disk device, flash memory or some other large capacity storage device.

The input/output device 840 provides input/output operations for the device 800. In one implementation, the input/output device 840 can include one or more of a wireless interface, an end user connection via an HFC/DSL network 860 or a connection to external WANs 870. In addition, such input/output device 840 can communicate with other external devices through interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other network (e.g., a HFC/DSL network 860 and/or external WANs 870), as well as sending communications to, and receiving communications from various networks.

The device (e.g., a broadband device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMA-Script instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A broadband communications device, comprising:
   a network interface operable to receive a data signal from and transmit a data signal to an external network;
   a processor operable to compute a maximum threshold associated with a service-flow from a configurable packet rate, a time interval, and a maximum traffic burst size;
   a packet-rate policer module operable to measure incoming packet rate and perform a packet-limiting response on a per-service flow basis if the maximum threshold associated with the service-flow is exceeded; and
   wherein the maximum threshold computation includes a stress factor, the stress factor being dynamically derived from the processor utilization rate thereby dynamically changing as processor utilization changes.

2. The broadband communications device of claim 1, wherein the packet-limiting response is further performed on a per-channel basis.

3. The broadband communications device of claim 2, wherein the packet-limiting response comprises dropping incoming packets until the packet rate is below the maximum threshold based on the per-service-flow basis.

4. The broadband communications device of claim 2, wherein the packet-limiting response comprises delaying incoming packets until the packet rate is below the maximum threshold based on the per-service-flow basis.

5. The broadband communications device of claim 2, wherein the packet-limiting response comprises marking incoming packets for further processing until the packet rate is below the maximum threshold based on the per-service-flow basis.

6. The broadband communications device of claim 1, wherein
   the packet-limiting response comprises dropping incoming packets until the packet rate is below the maximum threshold based on the per-service-flow basis.

7. The broadband communications device of claim 1, wherein the packet-limiting response comprises dropping incoming packets until the packet rate is below the maximum threshold based on the per-service-flow basis.

8. The broadband communications device of claim 1, wherein the packet-limiting response comprises delaying incoming packets until the packet rate is below the maximum threshold based on the per-service-flow basis.

9. The broadband communications device of claim 1, wherein the packet-limiting response comprises delaying incoming packets until the packet rate is below the maximum threshold based on the per-service-flow basis.

10. The broadband communications device of claim 1, wherein the packet-limiting response comprises marking incoming packets for further processing until the packet rate is below the maximum threshold based on the per-service-flow basis.

11. The broadband communications device of claim 1, wherein the packet-limiting response comprises marking incoming packets for further processing until the packet rate is below the maximum threshold based on the per-service-flow basis.

12. The broadband communications device of claim 1, wherein the packet-limiting response is operable to filter packets based on packet size associated with the packets.

13. A broadband communications device, comprising:
- a network interface operable to receive a data signal from and transmit a data signal to an external network;
- a processor operable to compute a maximum threshold associated with a service flow from a processor utilization rate, a configurable packet rate, a time interval, and a maximum traffic burst size;
- a packet-rate policer module operable to measure incoming packet rate and perform a packet-limiting response if the maximum threshold is exceeded, wherein the packet-limiting response is performed on a per-service-flow basis and the packet-limiting response comprises lowering the service-flow priority until the packet rate is below the maximum threshold.

14. A computer implemented method comprising:
- receiving a data stream via an interface;
- calculating a maximum threshold associated with a service flow from a configurable packet rate, a time interval, and a maximum traffic burst size via a processor;
- measuring incoming packet rate via computational logic;
- performing a packet-limiting response on a per-service flow basis if the maximum threshold is exceeded; and
- wherein the maximum threshold includes a stress factor derived from the processor utilization rate.

15. The computer implemented method of claim 14, wherein the packet-limiting response is further performed on a per-channel basis.

16. The computer implemented method of claim 14, wherein the packet-limiting response comprises dropping incoming packets until the maximum threshold is no longer exceeded.

* * * * *